United States Patent
Yu

(10) Patent No.: US 8,493,934 B2
(45) Date of Patent: Jul. 23, 2013

(54) METHOD, SYSTEM AND DEVICE FOR PROCESSING CIRCUIT SWITCHED SERVICES IN AN EVOLVED PACKET NETWORK

(75) Inventor: Yijun Yu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 278 days.

(21) Appl. No.: 12/831,437

(22) Filed: Jul. 7, 2010

(65) Prior Publication Data

US 2010/0272025 A1    Oct. 28, 2010

Related U.S. Application Data

(63) Continuation of application No. PCT/CN2008/073200, filed on Nov. 26, 2008.

(30) Foreign Application Priority Data

Jan. 16, 2008  (CN) .......................... 2008 1 0002762

(51) Int. Cl.
*H04W 4/00* (2009.01)
*H04W 72/02* (2009.01)
*H04L 12/66* (2006.01)
*H04L 12/28* (2006.01)

(52) U.S. Cl.
USPC ........... 370/331; 370/338; 370/352; 370/400; 455/452.2; 455/464

(58) Field of Classification Search
USPC ................. 370/310–350, 352–356, 400–401; 455/432.3, 435.1, 450–453, 456.5, 464, 431–444
See application file for complete search history.

(56) References Cited

U.S. PATENT DOCUMENTS 7,885,234 B2 *   2/2011  Ejzak .............................. 370/331
8,064,403 B2 *  11/2011  Zhao et al. ..................... 370/331

(Continued)

FOREIGN PATENT DOCUMENTS

CN        1812601 A      8/2006
CN       101039507       9/2007

(Continued)

OTHER PUBLICATIONS $3^{rd}$ Generation Partnership Project; Technical Specification Group Services and System Aspects; Circuit Switched Fallback in Evolved Packet System; Stage 2 (Release 8), 3GPP TS 23.272, v1.1.0, Apr. 2004 (pp. 1-25).

(Continued)

*Primary Examiner* — Tri H Phan
(74) *Attorney, Agent, or Firm* — Huawei Technologies Co., Ltd.

(57) ABSTRACT

The present invention discloses a method, system and device for processing circuit switched (CS) services in an evolved packet network. The method includes: by a mobility management entity (MME), receiving a mobile terminated (MT) service indication from a mobile switching center (MSC); sending the MT service indication to user equipment (UE); and receiving an MT service response returned by the UE and performing subsequent operations according to the MT service response. In the method of the present invention, when an MT service arrives, the MME does not trigger the evolved NodeB (eNodeB) to hand over the packet switched (PS) services of the UE but notifies the UE of the MT service and performs subsequent operations according to the MT service response returned by the UE, thus avoiding the waste of network resources caused by a meaningless handover of PS services.

18 Claims, 6 Drawing Sheets

U.S. PATENT DOCUMENTS

| | | | |
|---|---|---|---|
| 8,391,241 B2* | 3/2013 | Vikberg et al. | 370/331 |
| 2003/0026245 A1 | 2/2003 | Ejzak | |
| 2004/0152466 A1 | 8/2004 | Sinnarajah | |
| 2007/0218903 A1* | 9/2007 | Grech | 455/436 |
| 2008/0214190 A1* | 9/2008 | Aalto | 455/435.1 |
| 2009/0036131 A1* | 2/2009 | Diachina et al. | 455/436 |
| 2010/0080171 A1* | 4/2010 | Rune et al. | 370/328 |
| 2010/0189035 A1 | 7/2010 | Pehrsson | |
| 2010/0272025 A1 | 10/2010 | Yu | |
| 2010/0303007 A1* | 12/2010 | Witzel et al. | 370/328 |
| 2010/0303041 A1 | 12/2010 | Diachina | |
| 2011/0274046 A1 | 11/2011 | Rune | |

FOREIGN PATENT DOCUMENTS

| | | |
|---|---|---|
| CN | 101090567 | 12/2007 |
| EP | 1081971 | 3/2001 |
| JP | 2006516870 A | 7/2006 |
| JP | 2010516167 A | 5/2010 |
| JP | 2010531566 A | 9/2010 |
| JP | 2011508496 A | 3/2011 |
| WO | 2006/077555 | 7/2006 |
| WO | 2007/137615 | 12/2007 |
| WO | WO 2009/000315 | 12/2008 |

OTHER PUBLICATIONS

International Search Report, mailed Feb. 5, 2009, in corresponding International Application No. PCT/CN2008/073200 (4 pp.)

European Office Action dated Oct. 13, 2011 issued in corresponding European Patent Application No. 08870552.0.

3GPP TR 23.879 V1.0.0, *3rd Generation Partnership Project; Technical Specification Group Services and System Aspects; Study on Circuit Switched (CS) domain services over evolved Packet Switched (PS) access; Stage 2 (Release 8)*, Dec. 2007, pp. 1-40.

Written Opinion of the International Searching Authority, mailed Feb. 5, 2009, in corresponding International Application No. PCT/CN2008/073200 (6 pp.).

Extended European Search Report, mailed May 2, 2011, in corresponding European Application No. 08870552.0 (9 pp.).

Office action issued in corresponding to Chinese application No. 201110089487.1,dated Jan. 29, 2013,and an English translation thereof,total 7 pages.

3GPP TS 23.060 V7.6.0,3rd Generation Partnership Project;Technical Specification Group Services and System Aspects;General Packet Radio Service (GPRS);Service description;Stage 2(Release 7),Dec. 2007,total 217 pages.

3GPP TSG-RAN WG2 R2-080027,"CS Fallback: Overview and Open Issues",NTT DoCoMo, Inc., NEC, Jan. 14-18, 2008,total 3 pages.

3GPP TSG SA WG2 Architecture—S2#57 52-072521,"Fallback from eUTRAN to 2G/3G access for CS Voice Services", Ericsson, Jun. 25-29, 2007, total 4 pages.

Search Report issued in corresponding to Chinese application No. 201110089487.1,dated Jan. 21, 2013,total 2 pages.

Determination of Allowance in corresponding to Japanese application No. 2010-542499,dated Dec. 20, 2011,and an English translation thereof,total 4 pages.

Determination of Allowance in corresponding to Japanese application No. 2012-006889,dated Apr. 3, 2012,and an English translation thereof,total 4 pages.

Office action issued in corresponding to U.S. Appl. No. 13/557,033, dated Oct. 23, 2012, total 16 pages.

* cited by examiner

METHOD, SYSTEM AND DEVICE FOR PROCESSING CIRCUIT SWITCHED SERVICES IN AN EVOLVED PACKET NETWORK

CROSS-REFERENCE TO RELATED APPLICATIONS

This application is a continuation of International Application No. PCT/CN2008/073200, filed on Nov. 26, 2008, which claims priority to Chinese Patent Application No. 200810002762.X, filed on Jan. 16, 2008, both of which are hereby incorporated by reference in their entireties.

FIELD OF THE INVENTION

The present invention relates to communications technologies, and in particular, to a method, system and device for processing circuit switched services in an evolved packet network.

BACKGROUND OF THE INVENTION

To answer the challenge of wireless broadband technologies and maintain the leadership of the $3^{rd}$ Generation Partnership Project (3GPP) networks, the 3GPP organization prepared a long term evolution (LTE) plan at the end of 2004. Directed by the LTE plan, new mobile communications network architecture is defined, where only the packet switched (PS) domain remains. The architecture is called an evolved packet system (EPS).

To enable circuit switched (CS) services in an EPS network, a prior art provides a method for processing CS services in an EPS network, which may be described as a CS fallback method.

When a mobile switching center (MSC) receives a mobile terminated (MT) service, such as a CS voice call, the MSC sends a page message to a mobility management entity (MME) and the MME pages user equipment (UE) via the EPS network. When an evolved NodeB (eNodeB) receives the page message, the eNodeB first executes a PS service handover, that is, the eNodeB hands over the ongoing PS service of the UE to the PS domain of a general packet radio service/universal mobile telecommunications system (GPRS/UMTS) network. Then, the eNodeB hands over the UE to a $2^{nd}$ generation/$3^{rd}$ generation (2G/3G) network, that is, the UE chooses a 2G/3G cell to camp. When the UE returns a page response to the MGC in the GPRS/UMTS network, the eNodeB completes processing of the MT service.

During research and practice of the prior art, however, the inventor finds that the prior art has at least the following weaknesses:

By using the CS fallback method in the prior art, the eNodeB executes a PS service handover immediately when receiving the page message from the MME, which results in the following problems:

1. Waste of network resources. According to the prior art, when an MT service arrives, the eNodeB hands over the PS service to the PS domain of a 2G/3G network and connects the MT service. In practice, the following case often happens: When the UE is handed over to a 2G/3G network and an MT service is connected, the user rejects the MT service because the user is unwilling or unable to answer. The eNodeB regards such MT services as services that have been completed and the eNodeB then hands over the PS services of the UE to the EPS network. Two PS service handovers are performed for an MT service that is not normally executed, and therefore network resources are wasted.

2. Impact on the ongoing PS service of the UE. For example, a UE is in a PS service (such as a video conference) in an EPS network when it receives a CS MT service (such as a private call). According to the prior art, the eNodeB hands over the video conference to the PS domain a 2G/3G network, but because the PS domain of the 2G/3G network does not support certain PS services in the EPS network, such as the video conference, the PS service will fail. Thus, the prior art impacts the ongoing PS services.

SUMMARY OF THE INVENTION

Embodiments of the present invention provide a method, system and device for processing CS services in an evolved packet network so as to avoid the waste of network resources and not to impact the current PS services of a UE.

For the above purpose, the embodiments of the present invention are implemented via the following technical solution:

A method for processing CS services in an evolved packet network includes:

receiving, by an MME, an MT service indication from an MSC;

sending, by the MME, the MT service indication to a UE; and by the MME, receiving an MT service response returned by the UE and performing subsequent operations according to the MT service response.

A method for processing CS services in an evolved packet network includes:

receiving, by an MME, a short message from an MSC;

by the MME, sending the short message to a UE if the UE is in active mode and activating the UE and sending the short message to the UE if the UE is in idle mode; and receiving, by the MME, a short message response from the UE.

An MME includes:

a page message receiving unit, configured to receive an MT service indication from an MSC;

an MT service notifying unit, configured to send the MT service indication to a UE;

a response receiving unit, configured to receive an MT service response returned by the UE; and a response processing unit, configured to perform subsequent operations according to the MT service response.

An MME includes:

a receiving unit, configured to receive a short message from an MSC;

a state judging unit, configured to judge whether a UE is in active or idle mode;

a sending unit, configured to send the short message received by the receiving unit to the UE when the state judging unit determines that the UE is in active mode;

an activating and sending unit, configured to activate the UE when the state judging unit determines that the UE is in idle mode and send the short message received by the receiving unit to the activated UE; and a short message response receiving unit, configured to receive a short message response from the UE.

A UE includes:

a notification receiving unit, configured to receive an MT service indication sent by an MME;

an notifying unit, configured to notify the user of the MT service after the notification receiving unit receives the MT service indication; and a response sending unit, configured to return an MT service response to the MME according to a choice of the user regarding the MT service.

A system for processing CS services in an evolved packet network includes an MSC and an MME, where:

the MSC includes a service indication sending unit, configured to send an MT service indication to the MME after receiving the MT service indication;

the MME includes:

a page message receiving unit, configured to receive the MT service indication from the MSC;

an MT service notifying unit, configured to send the MT service indication to a UE;

a response receiving unit, configured to receive an MT service response returned by the UE; and a response processing unit, configured to perform subsequent operations according to the MT service response.

The technical solution provides the following benefits:

In the embodiments of the present invention, when a CS MT service arrives, the MME sends an MT service indication to notify the UE of the MT service and then performs subsequent operations according to an MT service response received from the UE. When the MT service arrives, the MME does not trigger the eNodeB to hand over the PS service of the UE, but notifies the UE of the MT service and carries out subsequent processing according to the MT service response returned by the UE. Thus, the embodiments of the present invention avoid the waste of network resources caused by a meaningless PS service handover and do not impact the ongoing PS services of the UE.

DETAILED DESCRIPTION OF THE INVENTION

To better explain the purpose, technical solution and advantages of the present invention, the embodiments of the present invention are hereinafter described in detail with reference to the accompanying drawings.

Figure 1:
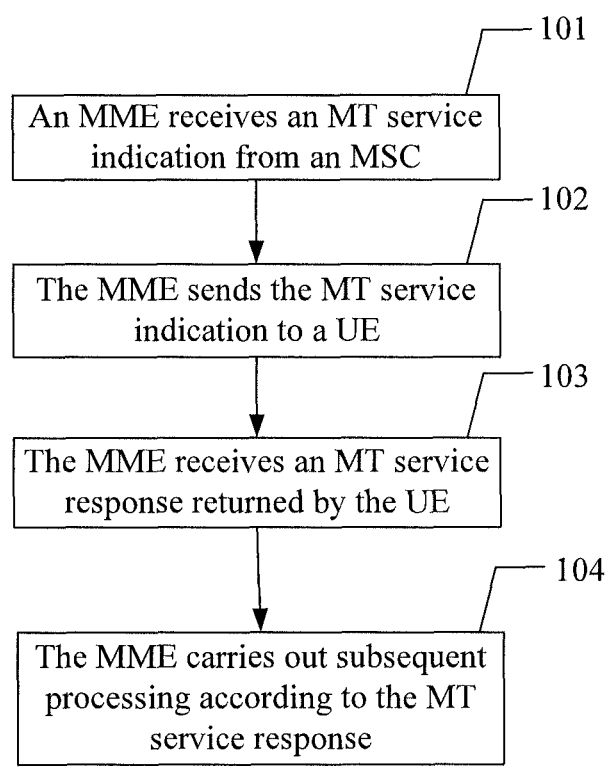
FIG. 1 is a flowchart of a CS fallback method provided in an embodiment of the present invention.

When a CS MT service arrives, as shown in FIG. 1, a CS fallback method provided in an embodiment of the present invention includes:

Step 101: An MME receives an MT service indication from an MSC.

Step 102: The MME forwards the MT service indication to a UE.

The MT service indication notifies the UE of an MT service.

Step 103: The MME receives an MT service response from the UE.

Step 104: The MME carries out subsequent processing according to the MT service response.

The above is a CS fallback method provided in an embodiment of the present invention. In the embodiment, when a CS MT service arrives, the MME first sends an MT service indication to notify the UE of the MT service and after reception of the MT service response from the UE, the MME carries out subsequent processing according to the MT service response. In the method provided in the embodiment of the present invention, when an MT service arrives, the MME does not trigger the eNodeB to hand over the PS service of the UE, but notifies the UE of the MT service and carries out subsequent processing according to the MT service response returned by the UE. Thus, the method avoids the waste of network resources caused by a meaningless PS service handover and does not impact the ongoing PS service of the UE.

In a specific implementation of the embodiment of the present invention, the MT service response may carry a user choice result. If the use chooses to reject the MT service, the MME returns an MT service Reject message to the MSC when the MME carries out subsequent processing according to the MT service response.

If the user chooses to accept the MT service, the MME sends a PS service handover request to the eNodeB and the eNodeB executes a PS service handover when the eNodeB receives the handover request and hands the UE over to a 2G/3G network. After the UE is handed over to the 2G/3G network, the eNodeB sends a first page response to the MSC and completes MT service processing.

In another embodiment of the present invention, if the user chooses to accept the MT service, the MME does not hand over the current PS service of the UE according to a configured network operation policy and therefore, the MME does not need to send a PS service handover request to the eNodeB and the eNodeB does not need to execute a PS handover later. In this case, after the UE sends the response indicating acceptance of the MT service, or receives a response from the MME regarding the UE's acceptance of the MT service, the UE accesses the 2G/3G network directly to complete the MT service processing.

The above describes the CS fallback method provided in an embodiment of the present invention. The following describes specific signaling flows of the method.

Figure 2:
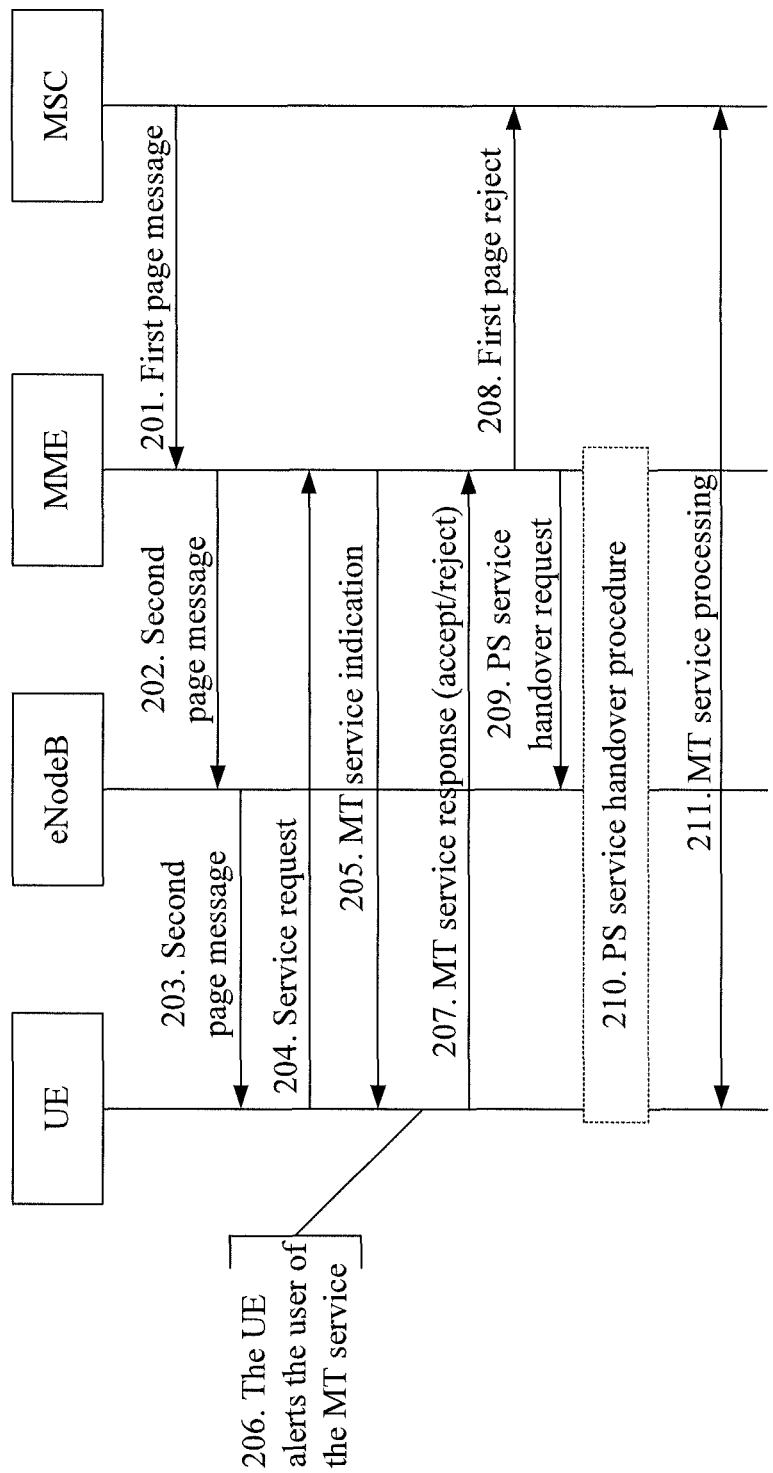
FIG. 2 is a signaling flow of a CS fallback method provided in Embodiment 1 of the present invention.

As shown in FIG. 2, a signaling flow of the CS fallback method in Embodiment 1 of the present invention includes:

Step 201: The MSC receives an MT service indication and sends a first page message to the MME.

In practice, the first page message may carry an international mobile subscriber identity (IMSI) of the UE.

Step 202: When receiving the first page message, the MME queries the UE state. If the UE is in idle mode, the MME sends a second page message to the eNodeB. If the UE is in active mode, the process proceeds to step 205.

In practice, the first page message may carry the MT service indication sent by the MSC to the MME. Therefore, the first page message may be named MT service request or alike. In addition, if the first page message carries the MT service indication, in step 302, after the MME receives the first page message, the MME needs to parse the first page message and query the UE state after the MT service indication is obtained.

In addition, the first page message may not carry the MT service indication. In this case, the MME is set to query the UE state once it receives the first page message. In this case, the first page message is equivalent to an MT service indication.

Step 203: The eNodeB broadcasts the second page message in the cell it manages.

Step 204: The UE receives the second page message and returns a service request to the MME.

The MME sends the second page message via the eNodeB to activate the idle UE.

Step 205: After receiving of the service request, the MME sends an MT service indication to the UE. The MT service indication is intended to notify the UE of the MT service.

The MT service indication shown in FIG. 2 is a non access stratum (NAS) message and therefore it may be sent to the UE directly from the MME. In another embodiment of the present invention, the MT service indication is an access stratum message (such as Page). The access stratum message may carry the MT service indication and is sent by the MME to the eNodeB and forwarded by the eNodeB to the UE. This does not impact the implementation of the present invention.

Step 206: After the UE receives the MT service indication, the UE notifies the user of the MT service.

In practice, the UE notifies the user of the MT service according to the presetting of the user. For example, the UE may ring, or vibrate, or ring and vibrate, or give a text notify, to notify the user of the MT service.

After the user makes a choice regarding the MT service, the UE executes step 207.

Step 207: The UE sends an MT service response to the MME.

The MT service response may carry the user choice result (accept or reject) or the MT service response does not carry a user choice result, that is, the user choice result is null. If the MT service response does not carry a user choice result, the MME may decide the user choice according to default settings. A common scenario is that, if the MT service response does not carry the choice result, the MME thinks that the user accepts the MT service by default.

Step 208: The MME obtains the choice result carried in the MT service response. If the user chooses to reject the MT service, the MME sends a first page reject message (the foregoing MT service reject). If the user chooses to accept the MT service, the process proceeds to step 209.

If the UE rejects the MT service, it is unnecessary to execute the MT service and the MME returns a first page reject message to the MSC to end the MT service. In the method provided in the embodiment of the present invention, if the UE does not execute the MT service, the eNodeB does not hand over the PS service of the UE. Thus the method avoids the waste of network resources caused by a meaningless PS handover and will not impact the current PS service of the UE.

The first page reject message may carry a cause value indicating the reason for rejecting the MT service or the message may not carry the cause value. Whether the message carries the cause value does not impact the implementation of the present invention.

In addition, the case often happens in daily life that the user does not see or feel the notifying of the UE in a long time. To improve the work efficiency of the MME, it may be defined in advance that, if the MME does not receive the MT service response from the UE within a preset time T, the MME thinks that the user rejects the MT service. And in this case, the MME sends the first page reject message to the MSC to reject the MT service.

Step 209: The MME sends a PS service handover request to the eNodeB.

Step 210: The eNodeB receives the PS service handover request and initiates a PS service handover procedure to hand the UE over to the 2G/3G network.

Step 211: After the UE is handed over to the 2G/3G network, the UE sends a first page response and completes the MT service processing.

In another embodiment of the present invention, after the MME receives the first page message, the MME may not query the UE state but thinks the UE is in idle mode by default. Then, the MME sends a second page message and an MT service indication to the UE to notify the active or idle UE of the MT service.

The above is a signaling flow provided in Embodiment 1 of the present invention. When the MME receives the first page message sent by the MSC in step 201, the MME may notify an idle or active UE of the MT service via steps 202-205 in Embodiment 1 of the present invention or via the signaling flow shown in FIG. 3. The signaling flow includes:

Step 301: The MME receives a first page message from the MSC and sends a third page message to the eNodeB. The third page message carries at least an MT service indication.

In practice, the MT service indication may be a page cause value in the third page message or an independent information element in the third page message, which will not impact the implementation of the present invention.

Step 302: The eNodeB broadcasts the third page message in the cell it manages.

Step 303: After the UE receives the third page message, the UE notifies the user of the MT service.

Figure 3:
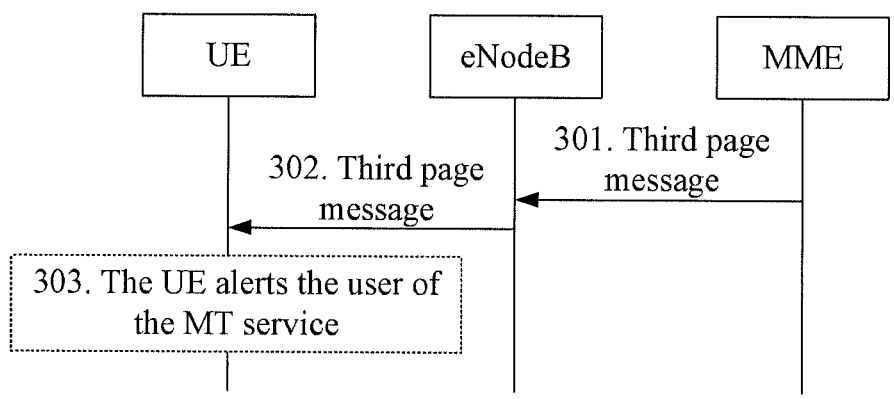
FIG. 3 is a signaling flow where a UE is activated and notified of an incoming MT service in Embodiment 1 of the present invention.

The signaling flow shown in FIG. 3 is different from steps 202-205 in Embodiment 1 of the present invention in the following aspects:

In Embodiment 1 of the present invention, the MME sends a message to notify the UE of an MT service only when the UE is in active mode. The UE may be already in active mode when the MME receives the first page message, or the UE may be activated through paging by the MME. In the signaling flow shown in FIG. 3, however, the MME does not check whether the UE is in active mode but notifies the UE of an MT service directly via a third page message.

Specifically, in Embodiment 1 of the present invention, when the UE is in idle mode, the MME sends the second page message and the MT service indication to notify the UE of the MT service; when the UE is in active mode, the MME sends the MT service indication directly to notify the UE of the MT service. The benefit of this signaling flow is that it does not impact the paging mechanism in the existing EPS network.

In the signaling flow shown in FIG. 3, the MME sends a third page message that carries the MT service indication to notify the UE of the MT service. The benefit is that it increases the processing efficiency of the MME and reduces the call delay.

To let the UE know information of the MT service originator to help the user make a choice regarding the MT service, in the preceding and following embodiments of the present invention, the first page message sent by the MSC to the MME may further carry MT service related information.

The MT service related information includes: a mobile station ISDN (MSISDN) of the originator, or a service type indication, such as short message service (SMS), location service (LCS), and unstructured supplementary service data (USSD). In addition, to help the MSC determine the MT service associated with the received MT service response, the MT service related information may further include an MT service ID that is allocated by the MSC or an existing ID (like a call number).

Because the first page message sent by the MSC to the MME carries the MT service related information, the page message or MT service indication sent by the MME to the UE may further carry the MT service related information. In this case, the UE notifies the user of the MT service according to the received MT service related information according to the presetting of the user. For example, the UE may display the MSISDN of the originator to the user or notify the user of the service type.

In the foregoing method, the user may choose to accept or reject the service. In certain scenarios, however, the user wishes to process the MT service after waiting for some time. It is therefore necessary to hold the MT service. Embodiment 2 of the present invention provides another CS fallback method. The method includes the following step based on the method shown in FIG. 1:

If the user chooses to hold the MT service, the MME sends an MT service Hold message to the MSC.

In addition, to guarantee that the MT service is restorable, the method further includes:

If the UE requests restoration of the held MT service, the MME notifies the MSC to restore the MT service; the MSC judges whether the MT service can be restored and if the service can be restored, the MSC notifies the UE of accessing the 2G/3G network via the MME and the UE then completes the MT service, or the MME triggers the eNodeB to hand the UE over to the 2G/3G network to complete the MT service according to a configured operation policy. If the MSC cannot restore the MT service, the restoration procedure is ended.

Figure 4:
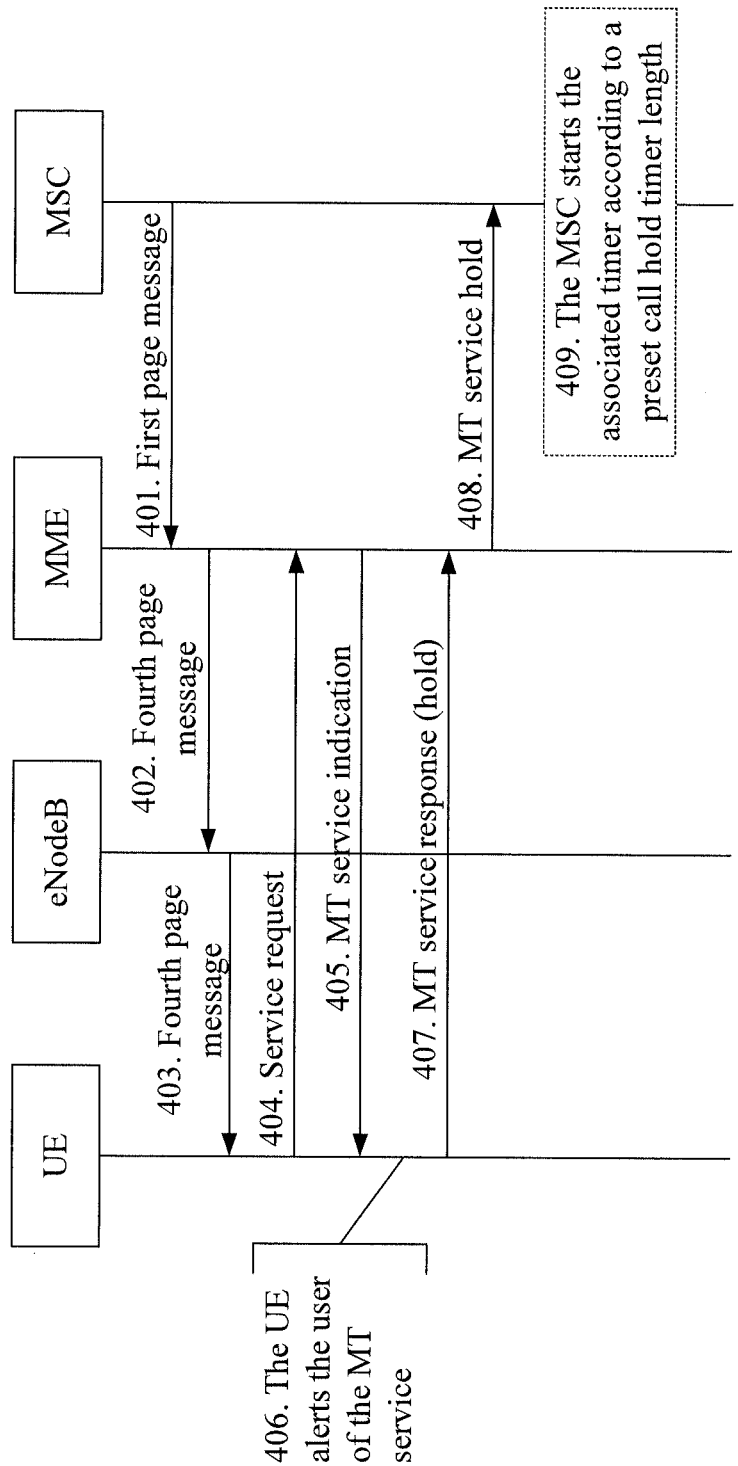
FIG. 4 is a signaling flow of a CS fallback method provided in Embodiment 2 of the present invention.

FIG. 4 shows a signaling flow of the CS fallback method in Embodiment 2 of the present invention. The signaling flow allows the user to choose to hold the MT service. The signaling flow includes:

Step 401: The MSC receives an MT service request and sends a first page message to the MME.

To avoid long-term MT service holding that consumes system resources, the method may further include a step of presetting a call hold timer and the first page message further carries the call hold timer length.

Step 402: The MME queries the state of the UE associated with the IMSI. If the UE is in idle mode, the MME sends a fourth page message to the eNodeB. If the UE is in active mode, the process proceeds to step 405.

Step 403: The eNodeB broadcasts the fourth page message in the cell it manages.

Step 404: The UE receives the fourth page message and returns a service request to the MME, Step 405: The MME sends an MT service indication to the UE to notify the UE of an MT service.

The ME service indication may or may not carry the MT service related information and/or the call hold timer length, which does not impact the implementation of the present invention.

Step 406: After the UE receives the MT service indication, the UE notifies the user of the MT service.

In practice, if the MT service indication carries the MT service related information, the UE notifies the user of the MT service according to the received MT service related information according to the presetting of the user. For example, the UE may display the MSISDN of the originator to the user or notify the user of the service type. The UE may ring, or vibrate, or ring and vibrate, or give a text notify to notify the user of the MT service.

After the user makes a choice regarding the MT service, the UE executes step 407.

Step 407: The UE sends an MT service response to the MME.

The MT service response may carry the user choice result (accept or reject) or the MT service response does not carry a user choice result, that is, the user choice result is null. If the MT service response does not carry a user choice result, the MME may decide the user choice according to default settings. A common scenario is that, if the MT service response does not carry the choice result, the MME thinks that the user accepts the MT service by default.

If the user chooses to hold the service, the UE starts the associated timer according to the call hold timer length.

Step 408: The MME obtains the choice result carried in the MT service response. If the user chooses to hold the MT service, the MME sends an MT service Hold message to the MSC; if the user chooses to reject or accept the MT service, the subsequent steps are the same as the procedure provided in Embodiment 1 of the present invention.

Step 409: The MSC starts the associated timer according to the preset call hold timer length.

In another embodiment of the present invention, after the MME receives the first page message, the MME may not query the UE state but thinks the UE is in idle mode by default. Then, the MME sends the fourth page message and the MT service indication to the UE to notify the active or idle UE of the MT service.

Figure 5:
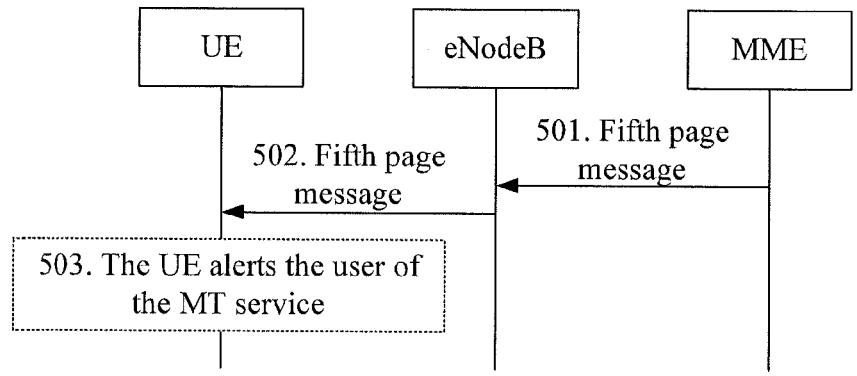
FIG. 5 is a signaling flow where a UE is activated and notified of an incoming MT service in Embodiment 2 of the present invention.

The above is a specific signaling flow of the CS fallback method provided in Embodiment 2 of the present invention. The active or idle UE may be notified of the MT service via steps 402-405. In another embodiment of the present invention, the signaling flow shown in FIG. 5 may be adopted to notify an active or idle UE of an MT service. The signaling flow includes:

Step 501: The MME receives a first page message from the MSC and sends a fifth page message to the eNodeB. The fifth page message carries at least an MT service indication.

To avoid long-term MT service holding that consumes system resources and help the user make a choice regarding the MT service, the MT service request may further carry a preset call hold timer length and/or MT service related information.

Step 502: The eNodeB broadcasts the fifth page message in the cell it manages.

Step 503: After the UE receives the fifth page message, the UE notify the user of the MT service.

The CS fallback method provided in the embodiments of the present invention and the specific implementation procedures are described above.

Figure 6:
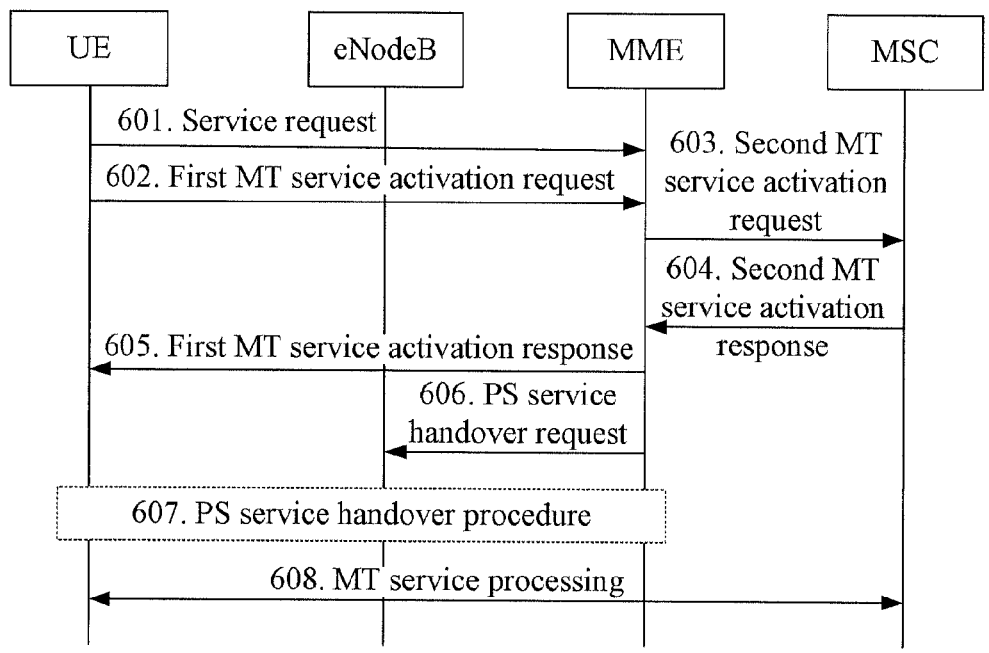
FIG. 6 is a signaling flow of an MT service restoring method provided in an embodiment of the present invention.

For a user-held MT service, if the user chooses to continue the service, the MT service needs to be restored. When the user requests restoration of the MT service, if the UE starts a timer when the MT service is held, the UE needs to check whether the timer has expired. If the timer has expired, the restoration procedure is over. If the timer has not expired, the restoration procedure is executed. With respect to the above MT service restoration procedure, an embodiment of the present invention provides a signaling flow for MT service restoration. As shown in FIG. 6, the signaling flow includes:

Step 601: If the UE is currently in idle mode, the UE sends a service request to the MME. When the UE becomes active from the idle mode, step 602 is executed. If the UE is in active mode, step 602 is executed directly.

Step 602: The UE sends a first MT service activation request to the MME, requesting to restore the held MT service.

The MT service activation request may carry the ID of the MT service to be activated so that the MME can determine the MT service. In certain scenarios (if the UE holds only one service), the MT service ID may not be carried, which does not impact the implementation of the present invention.

Step 603: The MME sends a second MT service activation request to the MSC.

Step 604: After the MSC receives the second MT service activation request, the MSC matches the MT service ID with the held MT service. If the service exists, the MSC accepts the activation request, stops the call hold timer, allocates the requested resource, and sends a second MT service activation response to the MME. The second MT service activation response carries a cause value of the successful operation. Otherwise, the MSC rejects the activation request and sends a second MT service activation response to the MME. The second MT service activation response carries a cause value of the failed operation.

In addition, if the call hold timer in the MSC expires, the MSC stops holding the MT service, releases the held resource, and stops the timer.

Optionally, different response messages may be sent to the MME in the scenarios of success and failure. The response message may also carry the MT service ID to help the UE determine the MT service.

Step 605: When the MME receives the second MT service activation response, the MME may send a first MT service activation response to the UE.

The first MT service activation response may carry the MT service ID carried in the second MT service activation response. Alternatively, the MME may not send the first MT service activation response and the implementation of the present invention will not be impacted.

Step 606: The MME sends a PS service handover request to the eNodeB.

In practice, the MME may proceed without handing over the current PS service of the UE according to the configured network operation policy and therefore the MME does not need to send a PS service handover request to the eNodeB and the eNodeB does not need to execute the PS handover procedure.

Step 607: The eNodeB receives the PS service handover request and initiates a PS service handover procedure to hand the UE over to the 2G/3G network.

Step 608: After the UE is handed over to the 2G/3G network, the UE sends the first page response and completes the MT service processing.

The above describes the CS fallback method provided in the embodiments of the present invention. In the CS fallback scenario, an SMS MT service may be sent to the UE via signaling of the UE in the EPS network without the need to hand over the UE to a 2G/3G network. For example, the first page message may carry the short message content and then the short message is sent to the UE via the EPS network. The UE receives the short message and completes related processing.

Those skilled in the art may understand that all or part of the steps of the method in the above embodiments of the present invention may be implemented by hardware under instructions of a program. The program may be stored in a computer-readable storage medium. When the program is executed, the following steps are performed:

by an MME, receiving an MT service indication from an MSC;

sending the MT service indication to a UE; and receiving an MT service response returned by the UE and performing subsequent operations according to the MT service response.

The storage medium may be a read-only memory, a magnetic disk or a compact disk.

Figure 7:
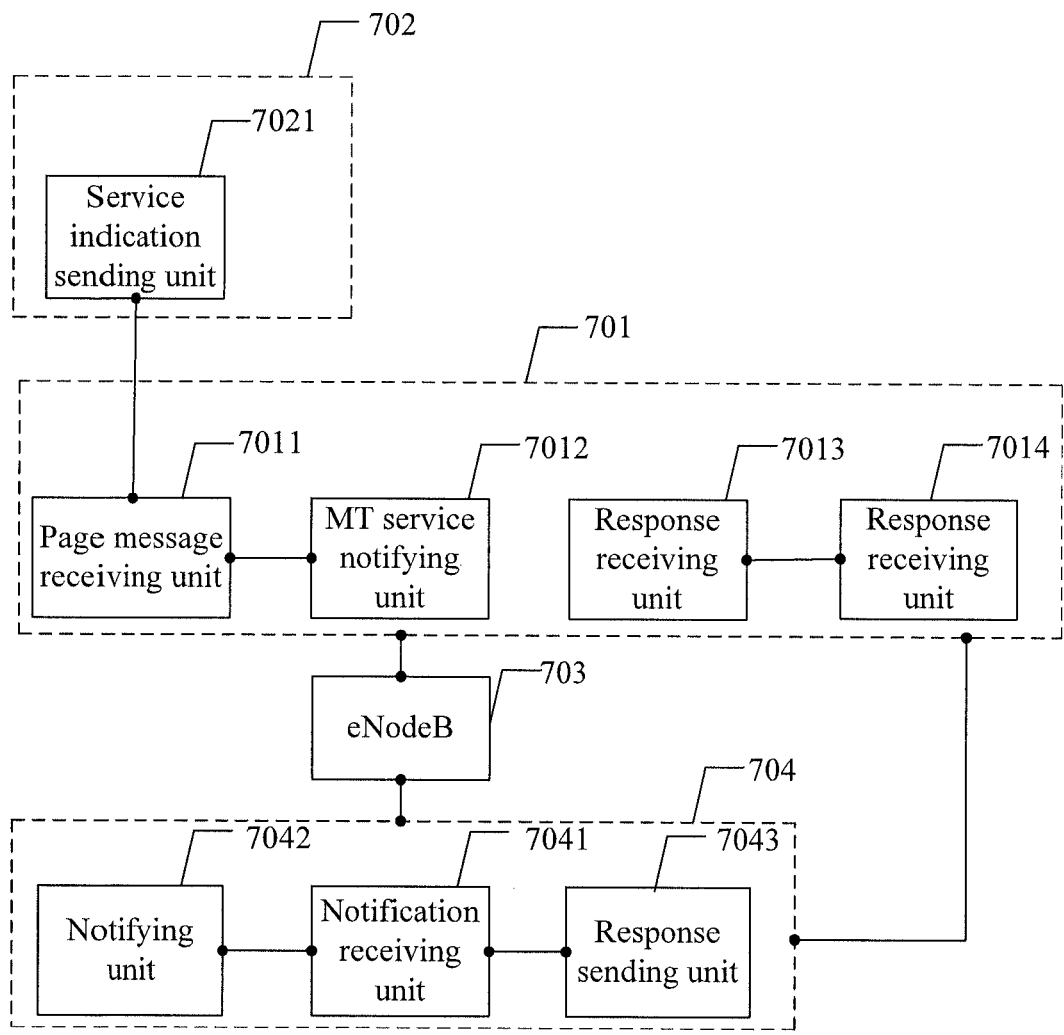
FIG. 7 shows a structure of a CS fallback system provided in an embodiment of the present invention.

FIG. 7 shows a CS fallback system provided in an embodiment of the present invention. The system includes: an MME 701, an MSC 702, and an eNodeB 703.

The MSC 702 includes a service indication sending unit 7021.

The service indication sending unit 7021 is configured to send an MT service indication to the MME 701 after receiving the MT service indication.

The MME 701 provided in the embodiment of the present invention includes:

a page message receiving unit 7011, configured to receive the MT service indication from the MSC 702;

an MT service notifying unit 7012, configured to send the MT service indication to a UE 704;

a response receiving unit 7013, configured to receive the MT service response returned by the UE 704; and a response processing unit 7014, configured to perform subsequent operations according to the MT service response.

In practice, the MT service response carries a user choice result and the response processing unit 7014 includes:

a first response processing unit, configured to return an MT service Reject message to the MSC 702 if the user chooses to reject the MT service;

a second response processing unit, configured to return an MT service Hold message to the MSC 702 if the user chooses to hold the MT service; and a third response processing unit, configured to trigger the UE 704 to access a 2G/3G network if the user chooses to accept the MT service or if the user choice result is null.

To enable the UE to restore the held MT service, the MME 701 further includes:

an activation request receiving unit, configured to receive a first MT service activation request sent by the UE 704, requesting to restore the held MT service;

an activation request sending unit, configured to send a second MT service activation request to the MSC 702; and an activation response receiving unit, configured to receive a second MT service activation response returned by the MSC 702 and indicates to the UE 704 that the UE 704 should access the 2G/3G network.

The MSC 702 further includes:

an activation request receiving unit, configured to receive the second MT service activation request from the MME; and an activation response sending unit, configured to return the second MT service activation response after the activation request receiving unit receives the request.

Because some UEs are in idle mode in the EPS network, to activate the UEs, the MT service notifying unit 7012 includes:

a UE activating unit, configured to activate the UE 704 via the eNodeB 703;

a state querying unit, configured to: query the state of the UE 704, and trigger a sending unit if the UE 704 is in active mode, or trigger the UE activating unit if the UE 704 is in idle mode; and the sending unit, configured to send the MT service indication to the UE 704 if the UE 704 is in active mode.

In practice, the UE activating unit has two implementations.

In the first implementation, the unit includes:

a page message sending unit, configured to send a second page message to the eNodeB 703; and a service request receiving unit, configured to trigger the MT service notifying unit 7012 after receiving the service request returned by the UE 704.

In the second implementation, the UE activating unit is an activating and notifying unit.

The activating and notifying unit is configured to send a third page message that carries an MT service indication to the eNodeB 703. By sending the third page message to the eNodeB 703, the UE is activated and the MT service indication is sent to the UE.

An embodiment of the present invention provides an MME for processing of the SMS MT service in a CS fallback scenario. The MME may include:

a receiving unit, configured to receive a short message from an MSC;

a state judging unit, configured to judge whether a UE is in active or idle mode;

a sending unit, configured to send the short message received by the receiving unit to the UE when the state judging unit determines that the UE is in active mode;

an activating and sending unit, configured to activate the UE when the state judging unit determines that the UE is in idle mode and send the short message received by the receiving unit to the activated UE; and a short message response receiving unit, configured to receive a short message response from the UE.

The activating and sending unit may include:

a page sending unit, configured to send a second page message to the eNodeB;

a returned message receiving unit, configured to receive a service request returned by the UE; and a short message sending unit, configured to send the short message to the UE according to the service request received by the returned message receiving unit.

Or, the activating and sending unit may include:

a page sending unit, configured to send a third page message that carries the short message to the eNodeB.

FIG. 7 shows the UE 704 provided in an embodiment of the present invention. The UE 704 includes:

a notification receiving unit 7041, configured to receive the MT service indication sent by the MME 701;

an notifying unit 7042, configured to notify the user of the MT service after the notification receiving unit 7041 receives the MT service indication; and a response sending unit 7043, configured to return an MT service response to the MME according to the choice of the user regarding the MT service.

To make the held MT service restorable, the UE may further include:

an activation request sending unit, configured to send a first MT service activation request to the MME, requesting to restore the held MT service.

Further, the UE may include an MT service processing unit, configured to process the MT service.

Although the present invention has been described through several exemplary embodiments, the invention is not limited to such embodiments. It is apparent that those skilled in the art can make various modifications and variations to the invention without departing from the spirit and scope of the present invention. The invention is intended to cover the modifications and variations provided that they fall within the scope of protection defined by the following claims or their equivalents.

What is claimed is:

1. A method for processing circuit switched (CS) services in an evolved packet system (EPS) network, comprising:

receiving, by a mobility management entity (MME), an indication of a mobile terminated (MT) service from a mobile switching center (MSC), wherein the MT service is a CS service;

sending, by the MME, the indication of the mobile service to a user equipment (UE) in the EPS network;

receiving, by the MME, an MT service response from the UE that comprises a user choice; and determining, by the MME, according to the user choice, whether to trigger a process for the UE to hand over from the EPS network to a $2^{nd}$ generation or $3^{rd}$ generation (2G/3G) network to process the MT service.

2. The method of claim 1, wherein if the user choice is to reject the MT service, the process of handing over from the EPS network to the 2G/3G network is not triggered; or if the user choice is to hold the MT service, the process of handing over from the EPS network to the 2G/3G network is not triggered until the MME receives a restoration request from the UE to restore the MT service; or if the user choice is to accept the MT service, the process of handing over from the EPS network to the 2G/3G network is triggered; or if the user choice is null, the method further comprises:

determining, by the MME, the user choice according to a default setting, wherein the default setting is to accept or to reject the MT service; and according to the default setting, determining whether to trigger the process of handing over from the EPS network to the 2G/3G network.

3. The method of claim 2, wherein if the user choice is to reject the MT service, the method further comprises:

sending, by the MME, an MT service reject message to the MSC;

or wherein if the user choice is to hold the MT service, the method further comprises:

sending, by the MME, an MT service hold message to the MSC;

after receiving a restoration request to restore the MT service from the UE, notifying, by the MME, the MSC to restore the MT service; and triggering, by the MME, the process of handing over from the EPS network to the 2G/3G network;

or wherein if the user choice is to accept the MT service, the method further comprise:

triggering, by the MME, the process of handing over from the EPS network to the 2G/3G network.

4. The method of claim 1, wherein the indication of the MT service comprises information related to the MT service.

5. The method of claim 1, wherein the step of sending the indication of the MT service from the MME to the UE comprises:

querying, by the MME, a mode of the UE; and if the mode of the UE is active, sending by the MME, the indication of the MT service to the UE through a MT service indication message; or if the mode of the UE is idle, sending, by the MME, the indication of the MT service to the UE through a MT service indication message after activating the UE via an evolved NodeB (eNodeB).

6. The method of claim 5, wherein the step of activating the UE via the eNodeB comprises:

sending, by the MME, a page message to the eNodeB so that the eNodeB transmits the page message to the UE by broadcasting the page message in a cell managed by the eNodeB; and receiving, by the MME, a service request from the UE in response to the page message.

7. The method of claim 1, wherein the step of sending the indication of the MT service to the UE comprises:

sending, by the MME, a page message that carries the indication of the MT service to the eNodeB so that the eNodeB transmits the indication of the MT service to the UE through broadcasting the page message in a cell managed by the eNodeB.

8. A mobility management entity (MME), comprising:
a receiver, configured to receive an indication of a mobile terminated (MT) service from a mobile switching center (MSC), wherein the MT service is a circuit switched (CS) service;
a transmitter, configured to send the indication of the MT service to a user equipment (UE) in an evolved packet system (EPS) network;
the receiver being configured to receive an MT service response from the UE that comprises a user choice; and
a processor, configured to determine, according to the user choice, whether to trigger a process for the UE to hand over from the EPS network to a $2^{nd}$ generation or $3^{rd}$ generation (2G/3G) network.

9. The MME of claim 8, wherein:
if the user choice is to reject the MT service, the process of handing over from the EPS network to the 2G/3G network is not triggered; or
if the user choice is to hold the MT service, the process of handing over from the EPS network to the 2G/3G network is not triggered until the MME receives a restoration request from the UE to restore the MT service; or
if the user choice is to accept the MT service, the process of handing over from the EPS network to the 2G/3G network is triggered; or
if the user choice is null, the processor is further configured to:
determine the user choice according to a default setting, wherein the default setting is to accept or to reject the MT service; and
according to the default setting, determine whether to trigger the process of handing over from the EPS network to the 2G/3G network.

10. The MME of claim 9, wherein the processor is further configured to:
if the user choice is to reject the MT service, send an MT service reject message to the MSC; or
if the user choice is to hold the MT service, send an MT service hold message to the MSC, and after receiving a restoration request to restore the MT service from the UE, notify the MSC to restore the MT service, and trigger the process of handing over from the EPS network to the 2G/3G network; or
if the user choice is to accept the MT service, trigger the process of handing over from the EPS network to the 2G/3G network.

11. The MME of claim 8, wherein the transmitter configured to send the indication of the MT service to the UE is configured to:
query a mode of the UE;
if the querying result is that the mode of the UE is idle, activate the UE via an evolved NodeB (eNodeB) and send the indication of the MT service to the UE through a MT service indication message, or
if the querying result is that the mode of the UE is active, send the indication of the MT service to the UE through a MT service indication message.

12. The MME of claim 11, wherein in activating the UE via the eNodeB,
the transmitter is further configured to send a page message to the eNodeB so that the eNodeB transmits the page message to the UE through broadcasting the page message in a cell managed by the eNodeB; and
the receiver is further configured to receive a service request from the UE in response to the page message.

13. The MME of claim 8, wherein in sending the indication of the MT service to the UE, the transmitter is further configured to:
send a page message that carries the indication of the MT service to an eNodeB so that the eNodeB transmits the indication to the UE through broadcasting the page message in a cell managed by the eNodeB.

14. A user equipment (UE) capable of communication in an evolved packet system (EPS) network, comprising:
a receiver, configured to receive an indication of a mobile terminated (MT) service from a mobility management entity (MME), wherein the MT service is a circuit switched (CS) service;
a user interface, configured to receive a user choice regarding the MT service from a user of the UE, wherein the received user choice is used by the MME to determine whether to trigger a process for the UE to hand over from the EPS network to a $2^{nd}$ generation or $3^{rd}$ generation (2G/3G) network to process the MT service; and
a transmitter, configured to send to the MME an MT service response that comprises the user choice.

15. The UE of claim 14, further comprising:
a processor, configured to:
if the user choice is to accept the MT service, perform one or more steps of the process to hand over the UE from the EPS network to the 2G/3G network, or
if the user choice is to hold the MT service, and a restoration request has been sent to the MME to restore the MT service, perform one or more steps of the process to hand over the UE from the EPS network to the 2G/3G network; and
after the UE has been handed over to the 2G/3G network, process the MT service.

16. A method for processing circuit switched (CS) services in an evolved packet system (EPS) network, comprising:
receiving, by a user equipment (UE) in the EPS network, an indication of a mobile terminated (MT) service from a mobility management entity (MME), wherein the MT service is a CS service;
obtaining, by the UE, a user choice regarding the MT service from a user of the UE, wherein the user choice is used by the MME to determine whether to trigger a process for the UE to hand over from the EPS network to a $2^{nd}$ generation or $3^{rd}$ generation (2G/3G) network to process the MT service; and
sending, by the UE, an MT service response to the MME that comprises the user choice.

17. The method of the claim 16, wherein the step of obtaining the user choice regarding the MT service from the user of the UE comprises:
notifying, by the UE, the user of the MT service according to a preset configuration, wherein the preset configuration provides one or more choices for the user to select from; and
receiving, by the UE, the user choice inputted by the user.

18. The method of claim 16, further comprising:
if the user choice is to accept the MT service, performing, by the UE, one or more steps of the process to hand over the UE from the EPS network to the 2G/3G network, and processing the MT service; or
if the user choice is to hold the MT service, after sending, by the UE, a restoration request to the MME to restore the MT service, performing one or more steps of the process to hand over the UE from the EPS network to the 2G/3G network, and processing the MT service.

* * * * *